(12) United States Patent
Lee et al.

(10) Patent No.: US 9,125,159 B2
(45) Date of Patent: Sep. 1, 2015

(54) MOBILE TERMINAL AND OPERATION CONTROL METHOD THEREOF

(75) Inventors: Seungwon Lee, Seoul (KR); Jinwook Choi, Seoul (KR); Seungcheon Baek, Seoul (KR); Jungsu Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 665 days.

(21) Appl. No.: 13/203,863

(22) PCT Filed: Sep. 1, 2010

(86) PCT No.: PCT/KR2010/005930
§ 371 (c)(1),
(2), (4) Date: Aug. 30, 2011

(87) PCT Pub. No.: WO2012/030001
PCT Pub. Date: Mar. 8, 2012

(65) Prior Publication Data
US 2012/0052817 A1    Mar. 1, 2012

(51) Int. Cl.
*H04B 1/00* (2006.01)
*H04W 52/02* (2009.01)
*H04M 1/00* (2006.01)
*H04B 1/38* (2006.01)

(52) U.S. Cl.
CPC ...... *H04W 52/0258* (2013.01); *H04W 52/0267* (2013.01)

(58) Field of Classification Search
CPC .......... H04M 1/7253; H04M 1/72569; H04M 1/72572; H04W 24/02; H04W 8/18
USPC ...................... 455/41.3; 700/17, 83
See application file for complete search history.

(56) References Cited

U.S. PATENT DOCUMENTS

| | | | | |
|---|---|---|---|---|
| 8,385,884 | B1 * | 2/2013 | Hertzfeld et al. | 455/411 |
| 2006/0087981 | A1 * | 4/2006 | Sengupta et al. | 370/252 |
| 2006/0259803 | A1 * | 11/2006 | Edwards et al. | 713/320 |
| 2008/0253351 | A1 * | 10/2008 | Pernu et al. | 370/345 |
| 2009/0157632 | A1 * | 6/2009 | Ryu et al. | 707/3 |
| 2010/0075610 | A1 | 3/2010 | Dennard et al. | |

(Continued)

FOREIGN PATENT DOCUMENTS

| | | |
|---|---|---|
| KR | 10-2005-0060685 A | 6/2005 |
| KR | 10-0786489 B1 | 12/2007 |

(Continued)

*Primary Examiner* — Ayodeji Ayotunde
(74) *Attorney, Agent, or Firm* — Birch, Stewart, Kolasch & Birch, LLP

(57) ABSTRACT

Disclosed herein is a mobile terminal and an operation control method thereof in which the status of a wireless communication unit is controlled based on a user's usage pattern for the wireless communication unit in the mobile terminal, thereby reducing the consumption of a battery caused by the abuse of the wireless communication unit in the mobile terminal and allowing the user to conveniently connect to an external device. In order to accomplish the foregoing object, the mobile terminal according to an embodiment of the present disclosure may include a wireless communication unit; a storage unit configured to store a usage pattern of the wireless communication unit; and a controller configured to provide an interface of changing or capable of changing the wireless communication unit to an active or inactive state based on the usage pattern, wherein the usage pattern is changed based on time or location information.

13 Claims, 9 Drawing Sheets

(a)

(b)

(56) References Cited

U.S. PATENT DOCUMENTS

2011/0034129 A1* 2/2011 Kim et al. .................... 455/41.3
2011/0131521 A1* 6/2011 Cho et al. ...................... 715/772

FOREIGN PATENT DOCUMENTS

| KR | 10-0839537 B1 | 6/2008 |
| KR | 10-2010-0042801 A | 4/2010 |

* cited by examiner (a)

(b)

(c)

(a)

(b)

(a) (b)

(a)

| TIME | STATUS | DEVICE_ID | DURATION_TIME |

(b)

| START_TIME | END_TIME | STATUS | DEVICE_ID | DURATION_TIME |

MOBILE TERMINAL AND OPERATION CONTROL METHOD THEREOF

TECHNICAL FIELD

The present disclosure relates to a mobile terminal and an operation control method thereof, and more particularly, to a mobile terminal for controlling the status of a wireless communication unit provided in the mobile terminal, and a method for controlling the status of a wireless communication unit provided in such a mobile terminal.

BACKGROUND ART

In recent years, as a mobile terminal provides complicated and various functions, considerations are required for the convenience of a user interface (UI) including network connection, and the like.

TECHNICAL GIST OF THE PRESENT INVENTION

A technical task of the present invention is to provide a mobile terminal and an operation control method thereof in which the status of a wireless communication unit is controlled based on a user's usage pattern for the wireless communication unit in the mobile terminal, thereby reducing the consumption of a battery caused by the abuse of the wireless communication unit in the mobile terminal and allowing the user to conveniently connect to an external device.

Another technical task of the present invention is to provide a mobile terminal and an operation control method thereof in which the status of a wireless communication unit is controlled by using user schedule based log data stored in the mobile terminal, thereby allowing the mobile terminal to manage the connection establishment to an external device according to the user's context and effectively manage a battery in the mobile terminal.

In order to solve the foregoing technical task, a mobile terminal may include a wireless communication unit; a storage unit configured to store a usage pattern of the wireless communication unit; and a controller configured to provide an interface of changing or capable of changing the wireless communication unit to an active or inactive state based on the usage pattern, wherein the usage pattern is changed based on time or location information.

According to an embodiment, it is characterized in that the wireless communication unit may include at least one of a wireless internet module, a short-range communication module, and a location information module.

According to an embodiment, it is characterized in that the controller may provide an interface of changing or capable of changing the wireless communication unit to the active or inactive state based on a battery used amount according to the use of the wireless communication unit or a communication speed of the wireless communication unit. According to an embodiment, furthermore, the mobile terminal may further include a display unit, wherein the controller controls the display unit to display the battery used amount or the communication speed together with a status of the wireless communication unit.

According to an embodiment, it is characterized in that the controller may provide an interface of changing or capable of changing the wireless communication unit to the active or inactive state based on a battery used amount of the mobile terminal.

According to an embodiment, it is characterized in that the controller may control the wireless communication unit to transmit or receive data to or from an external device based on the usage pattern. According to an embodiment, furthermore, it is characterized in that the controller may control the wireless communication unit to perform synchronization of data with the external device based on the usage pattern.

According to an embodiment, it is characterized in that the controller may control the execution of an application that uses the wireless communication unit based on the usage pattern.

According to an embodiment, it is characterized in that the usage pattern may include information on a status of the wireless communication unit.

According to an embodiment, it is characterized in that the usage pattern may include information on an external device for which the connection is set or the connection setting is released by the wireless communication unit under control of the controller.

According to an embodiment, it is characterized in that the usage pattern may include information on a duration time of the connection set in an external device by the wireless communication unit under control of the controller.

In order to solve the foregoing technical task, a method of controlling the operation of a mobile terminal may include generating a usage pattern of a wireless communication unit; acquiring time or location information; checking the status information of the wireless communication unit corresponding to the time or location information from the usage pattern; and providing an interface of changing or capable of changing the wireless communication unit to an active or inactive state based on the checked status information.

On the other hand, in order to solve the foregoing another technical task, a mobile terminal may include a wireless communication unit; a storage unit configured to store log data associated with a user's schedule; and a controller configured to provide an interface of changing or capable of changing the wireless communication unit to an active or inactive state based on the log data.

According to an embodiment, it is characterized in that the controller may acquire location information reflecting the location of the mobile terminal from the log data, and provide an interface of changing or capable of changing the wireless communication unit to the active or inactive state based on the acquired location information. According to an embodiment, furthermore, it is characterized in that the storage unit may store data in which the location information of the mobile terminal has been collected, and the controller may provide an interface of changing or capable of changing the wireless communication unit to the active or inactive state based on the acquired location information or the collected data.

According to an embodiment, it is characterized in that the controller may acquire the user's situation information from the log data, and provides an interface of changing or capable of changing the wireless communication unit to the active or inactive state based on the acquired situation information. According to an embodiment, furthermore, it is characterized in that the storage unit may store information on a recommended status of the wireless communication unit according to the user's situation information, and the controller may provide an interface of changing or capable of changing the wireless communication unit to the active or inactive state based on information on the log data or the recommended status.

On the other hand, in order to solve the foregoing another technical task, a method of controlling the operation of a mobile terminal may include generating log data associated with a user's schedule; acquiring the location information of the mobile terminal or the user's situation information based on the log data; and providing an interface of changing or capable of changing the wireless communication unit to an active or inactive state based on the log data, the location information, or the situation information.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

MODE FOR CARRYING OUT THE PREFERRED EMBODIMENTS

In recent years, as radio communication is typically used in a mobile terminal, there has been increased interest in enhancing the performance and functions of a mobile terminal. In particular, as recent technologies have been developed from the communication scheme of transmitting a voice call to the communication scheme of transmitting various data, there has been increased interest in the method of reducing power consumption according to the processing of a call related to data that requires increased power consumption, namely, packet switching, in the mobile terminal using a limited power source.

On the other hand, the module providing a wireless communication function may be in an active or inactive state according to the power supply status thereof. Power may be supplied to the module providing a wireless communication function in an active state whereas power may not be supplied or only the minimum power may be supplied to the module providing a wireless communication function in an inactive state. The active state may include a state of allowing the module providing a wireless communication function to transmit and/or receive data to and/or from an external device, and a wait state for transmitting and/or receiving data to and/or from the external device.

Hereinafter, a mobile terminal associated with according to an embodiment of the present disclosure will be described in more detail with reference to the accompanying drawings. A suffix "module" or "unit" used for constituent elements used in the following description is merely intended for easy description of the specification, and the suffix itself does not give any special meaning or function.

Figure 1:
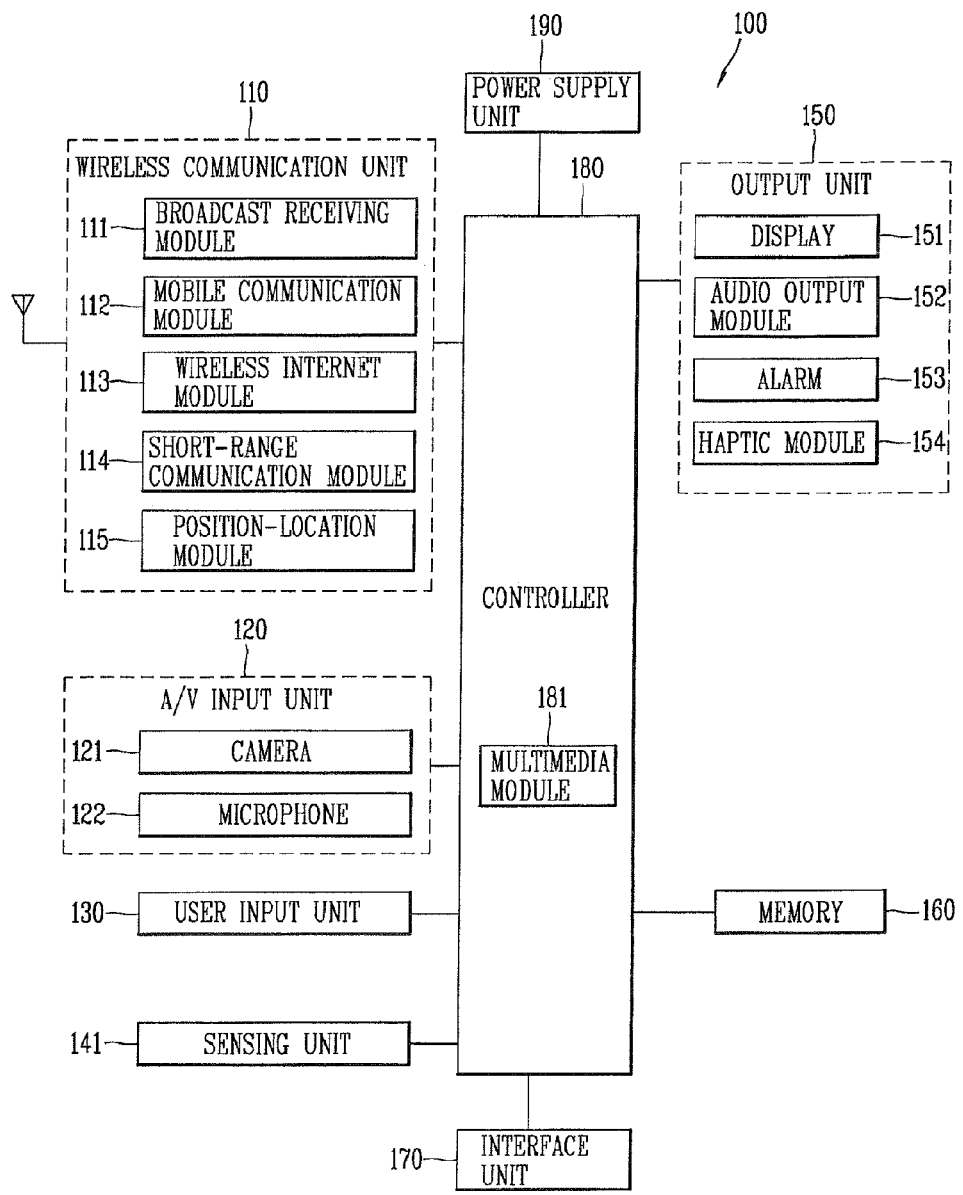
FIG. 1 is a block diagram illustrating a mobile terminal associated with an embodiment of the present invention.

FIG. 1 is a block diagram illustrating a mobile communication terminal associated with an embodiment of the present invention.

The mobile communication terminal 100 may include a wireless communication unit 110, an audio/video (A/V) input unit 120, a user input unit 130, a sensing unit 140, an output unit 150, a memory 160, an interface unit 170, a controller 180, a power supply unit 190, and the like. However, the constituent elements as illustrated in FIG. 1 are not necessarily required, and the mobile communication terminal may be implemented with greater or less number of elements than those illustrated elements. Hereinafter, the constituent elements will be described in sequence.

The wireless communication unit 110 typically includes one or more elements allowing radio communication between the mobile communication terminal 100 and a wireless communication system, or allowing radio communication between radio communication the mobile communication terminal 100 and a network in which the mobile communication terminal 100 is located. For example, the wireless communication unit 110 may include a broadcast receiving module 111, a mobile communication module 112, a wireless Internet module 113, a short-range communication module 114, a location information module 115, and the like.

The broadcast receiving module 111 receives broadcast signals and/or broadcast associated information from an external broadcast management server through a broadcast channel. The broadcast channel may include a satellite channel and/or a terrestrial channel. The broadcast management server may mean a server that generates and transmits a broadcast signal and/or broadcast associated information or a server that receives a previously generated broadcast signal and/or broadcast associated information and transmits to the mobile communication terminal 100. The broadcast signal may include a TV broadcast signal, a radio broadcast signal and a data broadcast signal as well as a broadcast signal in a form that a data broadcast signal is coupled to the TV or radio broadcast signal.

The broadcast associated information may mean information regarding a broadcast channel, a broadcast program, a broadcast service provider, and the like. The broadcast associated information may also be provided through a mobile communication network, and in this case, the broadcast associated information may be received by the mobile communication module 112. The broadcast associated information may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may receive a broadcast signal using various types of broadcast systems. In particular, the broadcast receiving module 111 may receive a digital broadcast signal using a digital broadcast system such as digital multimedia broadcasting-terrestrial (DMB-T), digital multimedia broadcasting-satellite (DMB-S), media forward link only (MediaFLO), digital video broadcast-handheld (DVB-H), integrated services digital broadcast-terrestrial (ISDB-T), and the like. The broadcast receiving module 111 is, of course, configured to be suitable for every broadcast system that provides a broadcast signal as well as the above-mentioned digital broadcast systems.

The broadcast signal and/or broadcast-associated information received through the broadcast receiving module 111 may be stored in the memory 160.

The mobile communication module 112 transmits and/or receives a radio signal to and/or from at least one of a base station, an external terminal and a server over a mobile communication network. Here, the radio signal may include a voice call signal, a video call signal and/or various types of data according to text and/or multimedia message transmission and/or reception.

The wireless Internet module 113 means a module for supporting wireless Internet access. The wireless Internet module 113 may be built-in or externally installed to the mobile communication terminal 100. Here, it may be used a wireless Internet access technique including a WLAN (Wireless LAN), Wi-Fi, Wibro (Wireless Broadband), Wimax (World Interoperability for Microwave Access), HSDPA (High Speed Downlink Packet Access), and the like.

The short-range communication module 114 is a module for supporting a short-range communication. Here, it may be used a short-range communication technology including Bluetooth, Radio Frequency IDentification (RFID), Infrared Data Association (IrDA), Ultra WideBand (UWB), ZigBee, and the like.

The location information module 115 is a module for checking or acquiring a location of the mobile communication terminal, and there is a GPS module as a representative example.

Referring to FIG. 1, the A/V (audio/video) input unit 120 receives an audio or video signal, and the A/V (audio/video) input unit 120 may include a camera 121 and a microphone 122. The camera 121 processes a image frame, such as still picture or video, obtained by an image sensor in a video phone call or image capturing mode. The processed image frame may be displayed on a display unit 151.

The image frames processed by the camera 121 may be stored in the memory 160 or transmitted to an external device through the wireless communication unit 110. Two or more cameras 121 may be provided according to the use environment of the mobile communication terminal.

The microphone 122 receives an external audio signal through a microphone in a phone call mode, a recording mode, a voice recognition mode, and the like, and processes the audio signal into electrical voice data. The processed voice data may be converted and outputted into a format that is transmittable to a mobile communication base station through the mobile communication module 112 in the phone call mode. The microphone 122 may implement various types of noise canceling algorithms to cancel noise generated in a procedure of receiving the external audio signal.

The user input unit 130 may generate input data to control an operation of the terminal. The user input unit 130 may be configured by including a keypad, a dome switch, a touch pad (pressure/capacitance), a jog wheel, a jog switch, and the like.

The sensing unit 140 detects a current status of the mobile communication terminal 100 such as an opened or closed status of the mobile communication terminal 100, a location of the mobile communication terminal 100, an orientation of the mobile communication terminal 100, and the like, and generates a sensing signal for controlling the operation of the mobile communication terminal 100. For example, when the mobile communication terminal 100 is a slide phone type, it may sense an opened or closed status of the slide phone. Furthermore, the sensing unit 140 takes charge of a sensing function associated with whether or not power is supplied from the power supply unit 190, or whether or not an external device is coupled to the interface unit 170. On the other hand, the sensing unit 140 may include a proximity sensor 141.

The output unit 150 is configured to provide an output for audio signal, video signal, or alarm signal, and the output unit 150 may include the display unit 151, an audio output module 152, an alarm unit 153, a haptic module 154, and the like.

The display unit 151 may display (output) information processed in the mobile communication terminal 100. For example, when the mobile communication terminal 100 is in a phone call mode, the display unit 151 may display a User Interface (UI) or a Graphic User Interface (GUI) associated with a call. When the mobile communication terminal 100 is in a video call mode or image capturing mode, the display unit 151 may display a captured image and/or received image, a UI or GUI.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display.

Some of those displays may be configured with a transparent or optical transparent type to allow viewing of the exterior through the display unit, which may be called transparent displays. An example of the typical transparent displays may include a transparent LCD (TOLED), and the like. Under this configuration, a user can view an object positioned at a rear side of a terminal body through a region occupied by the display unit 151 of the terminal body.

The display unit 151 may be implemented in two or more in number according to a configured aspect of the portable terminal 100. For instance, a plurality of the display units 151 may be arranged on one surface to be spaced apart from or integrated with each other, or may be arranged on different surfaces.

Here, if the display unit 151 and a touch sensitive sensor (referred to as a touch sensor) have an interlayer structure, the structure may be referred to as a touch screen. The display unit 151 may be used as an input device rather than an output device. The touch sensor may be implemented as a touch film, a touch sheet, a touch pad, and the like.

The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also a touch pressure.

When touch inputs are sensed by the touch sensors, corresponding signals are transmitted to a touch controller (not shown). The touch controller processes the received signals, and then transmits corresponding data to the controller 180.

Accordingly, the controller 180 may sense which region of the display unit 151 has been touched.

Referring to FIG. 1, a proximity sensor 141 may be arranged at an inner region of the portable terminal 100 covered by the touch screen, or near the touch screen. The proximity sensor indicates a sensor to sense presence or absence of an object approaching to a surface to be sensed, or an object disposed near a surface to be sensed, by using an electromagnetic field or infrared rays without a mechanical contact. The proximity sensor has a longer lifespan and a more enhanced utility than a contact sensor.

The proximity sensor may include an optical transmission type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

Hereinafter, for the sake of convenience of brief explanation, a status that the pointer is positioned to be proximate onto the touch screen without contact will be referred to as 'proximity touch', whereas a status that the pointer substantially comes in contact with the touch screen will be referred to as 'contact touch'. For the position corresponding to the proximity touch of the pointer on the touch screen, such position corresponds to a position where the pointer faces perpendicular to the touch screen upon the proximity touch of the pointer.

The proximity sensor senses proximity touch, and proximity touch patterns (e.g., proximity touch distance, proximity touch direction, proximity touch speed, time, proximity touch position, proximity touch moving status, etc.). Information relating to the sensed proximity touch and the sensed proximity touch patterns may be output onto the touch screen.

The audio output module 152 may output audio data received from the wireless communication unit 110 or stored in the memory 160, in a call-receiving mode, a call-placing mode, a recording mode, a voice recognition mode, a broadcast reception mode, and so on. The audio output module 152 may output audio signals relating to functions performed in the portable terminal 100, e.g., sound alarming a call received or a message received, and so on. The audio output module 152 may include a receiver, a speaker, a buzzer, and so on.

The alarm 153 outputs signals notifying occurrence of events from the portable terminal 100. The events occurring from the portable terminal 100 may include call received, message received, key signal input, touch input, and so on. The alarm 153 may output not only video or audio signals, but also other types of signals such as signals notifying occurrence of events in a vibration manner. Since the video or audio signals can be output through the display unit 151 or the audio output unit 152, the display unit 151 and the audio output module 152 may be categorized into a part of the alarm 153.

The haptic module 154 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 154 may generate various tactile effects, including not only vibration, but also arrangement of pins vertically moving with respect to a skin being touched, air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 154 may be configured to transmit tactile effects through a user's direct contact, or a user's muscular sense using a finger or a hand. The haptic module 154 may be implemented in two or more in number according to the configuration of the portable terminal 100.

The memory 160 may store a program for processing and controlling the controller 180. Alternatively, the memory 160 may temporarily store input/output data (e.g., phonebook data, messages, audios, still images, videos, and the like). Also, the memory 160 may store data related to various patterns of vibrations and sounds outputted upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile communication terminal 100 may operate a web storage which performs the storage function of the memory 160 on the Internet.

The interface unit 170 may generally be implemented to interface the portable terminal with external devices. The interface unit 170 may allow a data reception from an external device, a power delivery to each component in the portable terminal 100, or a data transmission from the portable terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like. The identification module may be configured as a chip for storing various information required to authenticate an authority to use the portable terminal 100, which may include a User Identity Module (UIM), a Subscriber Identity Module (SIM), and the like. Also, the device having the identification module (hereinafter, referred to as 'identification device') may be implemented in a type of smart card. Hence, the identification device can be coupled to the portable terminal 100 via a port.

Also, the interface unit 170 may serve as a path for power to be supplied from an external cradle to the portable terminal 100 when the portable terminal 100 is connected to the external cradle or as a path for transferring various command signals inputted from the cradle by a user to the portable terminal 100. Such various command signals or power inputted from the cradle may operate as signals for recognizing that the portable terminal 100 has accurately been mounted to the cradle.

The controller 180 typically controls the overall operations of the portable terminal 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component.

The controller 180 can perform a pattern recognition processing so as to recognize writing or drawing input on the touch screen as text or image.

The power supply unit 190 provides power required by various components under the control of the controller 180.

Various embodiments described herein may be implemented in a computer-readable medium using software, hardware, or any combination thereof.

For hardware implementation, it may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electrical units designed to perform the functions described herein. In some cases, such embodiments may be implemented in the controller 180 itself.

For software implementation, the embodiments such as procedures or functions may be implemented together with separate software modules that allow performing of at least one function or operation. Software codes can be implemented by a software application written in any suitable programming language. The software codes may be stored in the memory 160 and executed by the controller 180.

On the other hand, the memory 160 according to a first embodiment of the present disclosure may store a usage pattern of the wireless communication unit 110. The usage pattern of the wireless communication unit 110 may mean a status of the wireless communication unit 110 repeated at a specific time or location. For example, the usage pattern of the wireless communication unit 110 may include information on a repetitive status having a period such as specific time, date, day of the week, week, month, or year. Otherwise, for example, the usage pattern of the wireless communication unit 110 may include information on a repetitive status in a specific location or region.

The controller 180 may collect status information illustrating a status of the wireless communication unit 110 according to the time or location for a predetermined period of time. Otherwise, the controller 180 may generate a usage pattern of the wireless communication unit 110 based on the collected status information of the wireless communication unit 110. Here, the controller 180 may generate a usage pattern of the wireless communication unit 110 based on a frequency and/or duration time in which the wireless communication unit 110 is in an active state with a specific period of time or at a specific place. The controller 180 may store the generated pattern in the memory 160.

For example, the controller 180 may generate a pattern of the active state of the wireless communication unit 110 for a time in which the wireless communication unit 110 is in an active state 5 or more times and/or 5 or more minutes during a period of a day. Otherwise, the controller 180 may generate a pattern of the active state of the wireless communication unit 110 for a specific place in which the wireless communication unit 110 is in an active state 5 or more times and/or 5 or more minutes. In this case, the controller 180 may generate a pattern of the inactive state of the wireless communication unit 110 for a time or place excluding the time or location corresponding to the pattern of the active state.

Here, the active or inactive state has been described as an example, and the controller 180 may generate usage patterns for various states classified according to the power supply status. According to an embodiment, even in the active state, the controller 180 may generate a usage pattern for the status of allowing the wireless communication unit 110 to transmit and receive data or for the wait state of the wireless communication unit 110 capable of transmitting and receiving data.

Furthermore, the usage pattern generated by the controller 180 may be changed based on the status of the wireless communication unit 110 according to time or location information. The time or location included in a pattern in an active state may be changed to a pattern in an inactive state, and the time or location included in a pattern in an inactive state may be changed to a pattern in an active state. Here, the controller 180 may update a usage pattern based on the up-to-dateness of the status information. For example, the controller 180 may update a usage pattern based on the status information of the controller 180 for recent 5 days, or update a usage pattern by giving a weight to the status information according to the up-to-dateness of the status information.

The controller 180 may provide an interface of changing or capable of changing the wireless communication unit to an active or inactive state based on a usage pattern stored in the memory 160. For example, the controller 180 may acquire a current time based on a repeater or built-in counter. Otherwise, the controller 180 may acquire the current location information of the mobile terminal 100 from a signal received by the location information module 115 or a location based server (LBS). Furthermore, the controller 180 may check the status of the wireless communication unit 110 corresponding to current time or location information in a usage pattern stored in the memory 160. Furthermore, the controller 180 may check a current status of the wireless communication unit 110, and provide an interface of changing or capable of changing the wireless communication unit to a status corresponding to current time or location information when the current status is not the status of the wireless communication unit 110 corresponding to the time or location.

On the other hand, the memory 160 according to a second embodiment of the present disclosure may store log data associated with the user's schedule. For example, the log data associated with the user's schedule may be log data stored by a schedule management application (scheduler). Otherwise, the log data associated with the user's schedule may be log data stored by an application capable of storing data associated with the user's schedule such as a diary, a memo, a calendar, or the like.

The controller 180 may provide an interface of changing or capable of changing the wireless communication unit 110 to an active or inactive state based on log data. The controller 180 may collect the location information of the mobile terminal 100 during a predetermined period of time to store the collected location information in the memory 160. Furthermore, the controller 180 may acquire location information reflecting the location of the mobile terminal 100 according to the user's schedule from the log data stored in the memory 160. The controller 180 may provide an interface of changing or capable of changing the wireless communication unit 110 to an active or inactive state by comparing the collected location information of the mobile terminal 100 with the location information of the mobile terminal 100 acquired from the log data.

For example, if the location information of the mobile terminal 100 acquired from log data is not included in the collected location information of the mobile terminal 100, then the controller 180 may change the wireless communication unit 110 to an active state to maintain a connected state with an external device or a wait state capable of connecting thereto. Furthermore, for example, if the location information of the mobile terminal 100 acquired from the log data is included in the collected location information of the mobile terminal 100, then the controller 180 may change the wireless communication unit 110 to an inactive state to prevent the consumption of a battery.

Furthermore, the controller 180 may acquire the user's situation information from log data, and provide an interface of changing or capable of changing the wireless communication unit 110 to an active or inactive state based on the acquired situation information. The memory 160 may store a recommended status of the wireless communication unit 110 according to the user's situation. For example, if the user is in a meeting, then the wireless communication unit 110 may maintain an inactive state to prevent the consumption of a battery. Furthermore, for example, if the user is at work, then the wireless communication unit 110 may maintain an active state, thereby maintaining a connected state with an external device or becoming a wait state capable of connecting to the external device.

The controller 180 may syntactically analyze log data to acquire the user's situation information. For example, if the log data includes a field representing the user's situation information, then the controller 180 may acquire the user's situation information by extracting information corresponding to the field. Furthermore, the controller 180 may check a recommended status corresponding to the user's situation extracted from the log data in the recommended status of the wireless communication unit 110 according to the user's situation stored in the memory 160, and provide an interface of changing or capable of changing the wireless communication unit 110 to an active or inactive state according to the checked recommended status.

Figure 2:
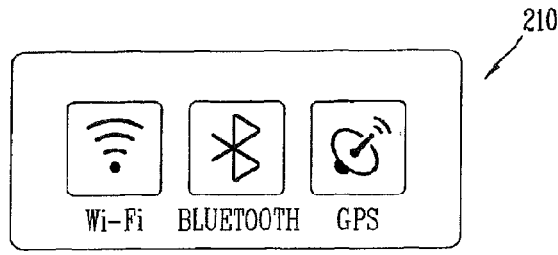
FIG. 2 is a conceptual view illustrating a status change of the wireless communication unit 110 according to the embodiments of the present disclosure.
Figure 2:
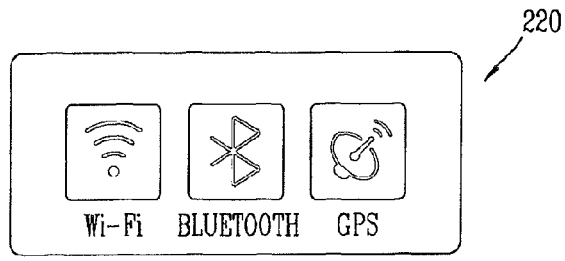
Figure 2:
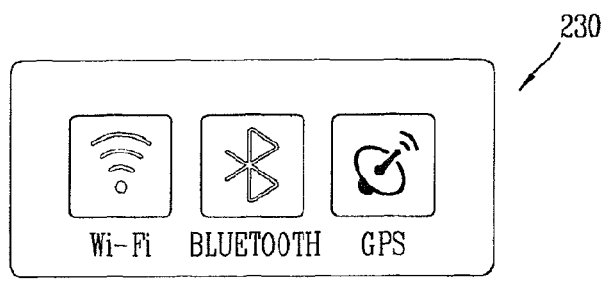

FIG. 2 is a conceptual view illustrating a status change of the wireless communication unit 110 according to the embodiments of the present disclosure.

According to an embodiment, a region 210 representing the status of the wireless communication unit 110 may include the items representing an active or inactive state for a wireless internet module 113 (for example, Wi-Fi), a short-range communication module 114 (for example, Bluetooth), and a location information module 115 (for example, GPS). The region 210 representing the status of the wireless communication unit 110, for example, may be displayed on an idle screen of the mobile terminal 100 in a widget form or displayed by the user's selection of an object set to call a function provided by the mobile terminal 100.

Referring to FIG. 2A, if Wi-Fi, Bluetooth, and GPS are active, then the items representing Wi-Fi, Bluetooth, and GPS may be displayed in an active state in the region 210 representing the status of the wireless communication unit 110.

Referring to FIG. 2B, if Wi-Fi, Bluetooth, and GPS are inactive, then the items representing Wi-Fi, Bluetooth, and GPS may be displayed in an inactive state in the region 210 representing the status of the wireless communication unit 110.

Referring to FIG. 2C, when Wi-Fi and Bluetooth are inactive and GPS is active, then the items representing Wi-Fi and Bluetooth may be displayed in an inactive state, and the item representing GPS may be displayed in an active state in the region 210 representing the status of the wireless communication unit 110.

Figure 3:
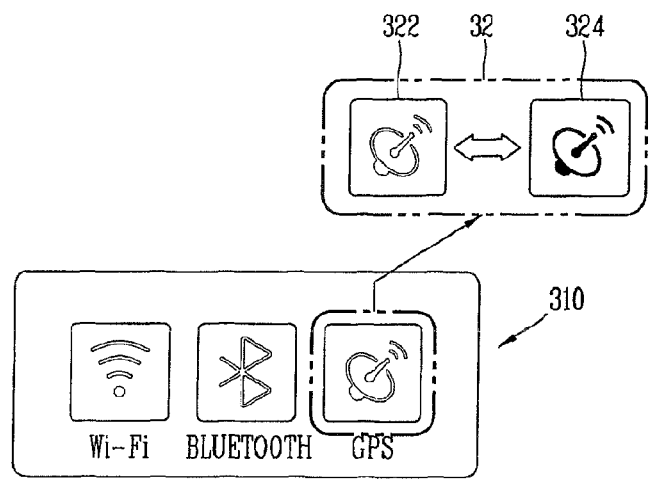
FIG. 3 is a conceptual view illustrating the status change interface provision of the wireless communication unit 110 according to the embodiments of the present disclosure.

FIG. 3 is a conceptual view illustrating the status change interface provision of the wireless communication unit 110 according to the embodiments of the present disclosure.

Referring to FIG. 3, according to an embodiment, Wi-Fi and Bluetooth maintain an inactive state, and the items representing Wi-Fi and Bluetooth may maintain the display of an inactive state in the region 310 representing the status of the wireless communication unit 110. An interface capable of changing GPS from an inactive state to an active state may be provided by the controller 180, and in this case, the item representing GPS may be distinguished from the items representing Wi-Fi and Bluetooth. For example, the size, shape or color of the item representing GPS may be displayed to be distinguished from that of the items representing Wi-Fi and Bluetooth. According to an embodiment, the item 320 representing GPS may be displayed to be periodically switched between an item 322 representing the display of an inactive state and an item 324 representing the display of an active state, thereby providing an interface capable of changing GPS to an active state. Upon receiving an input of changing GPS to an active state through the user input unit 130 from the user, the controller 180 may change GPS to an active state.

Figure 4:
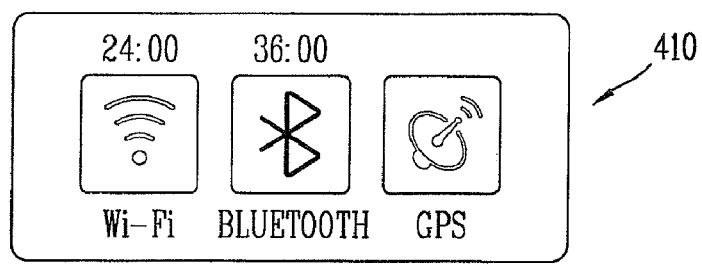
FIG. 4 is a conceptual view illustrating a status change of the wireless communication unit 110 according to a first embodiment of the present disclosure.
Figure 4:
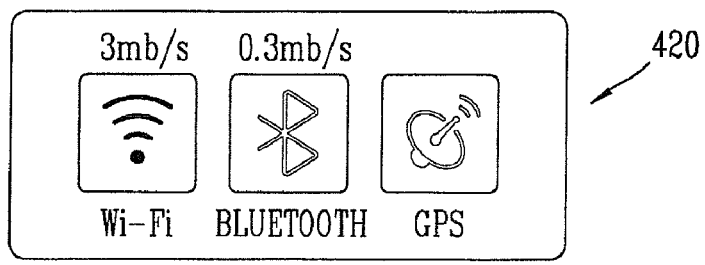

FIG. 4 is a conceptual view illustrating a status change of the wireless communication unit 110 according to a first embodiment of the present disclosure.

The controller 180 may provide an interface of changing or capable of changing the wireless communication unit 110 to an active or inactive state based on a battery used amount according to the use of the wireless communication unit 110 or a communication speed of the wireless communication unit 110.

Referring to FIG. 4A, according to an embodiment, for the status of the wireless communication unit 110 corresponding to a current time or location of the wireless communication unit 110 in a usage pattern of the wireless communication unit 110 stored in the memory 160, Wi-Fi and Bluetooth may be active and GPS may be inactive. In this case, the controller 180 may check the used amounts of battery according to the use of Wi-Fi and Bluetooth and compare the used amounts of battery according to the use of Wi-Fi and Bluetooth to provide an interface of changing or capable of changing only Bluetooth having a less used amount of battery to an active state.

Furthermore, the controller 180 may control the display unit 151 to display a battery used amount according to the use of the wireless communication unit 110 together with a status of the wireless communication unit 110. For example, the controller 180 may check a battery remaining amount of the mobile terminal 100, to display a time (for example, 24:00, 36:00, or the like) during which the mobile terminal 100 can maintain power when the wireless communication unit 110 is in an active state based on the battery remaining amount and a battery used amount according to the use of the wireless communication unit 110 together with the item representing the status of the wireless communication unit 110.

Furthermore, Referring to FIG. 4B, according to an embodiment, for the status of the wireless communication unit 110 corresponding to a current time or location of the wireless communication unit 110 in a usage pattern of the wireless communication unit 110 stored in the memory 160, Wi-Fi and Bluetooth may be active and GPS may be inactive. In this case, the controller 180 may check the battery speeds of Wi-Fi and Bluetooth and compare the communication speeds of Wi-Fi and Bluetooth to provide an interface of changing or capable of changing only Wi-Fi having a higher communication speed to an active state.

Furthermore, the controller 180 may control the display unit 151 to display a communication speed of the wireless communication unit 110 together with a status of the wireless communication unit 110. For example, the controller 180 may check a communication speed of the mobile terminal 100 to display the communication speed (for example, 3.0 Mb/s, 0.3 Mb/s, or the like) together with the item representing the status of the wireless communication unit 110.

On the other hand, the controller 180 may provide an interface of changing or capable of changing the wireless communication unit 110 to an active or inactive state based on a battery used amount of the mobile terminal 100. The controller 180 compares the battery used amount of the mobile terminal 100 with a threshold value for the active or inactive state of the wireless communication unit 110 to provide an interface of changing or capable of changing the wireless communication unit 110 to an active or inactive state.

For example, if the battery used amount exceeds 80% when the threshold value for the active state of the wireless communication unit 110 is 80%, then the wireless communication unit 110 can maintain an inactive state even if it should be changed to the active state according to the usage pattern.

Figure 5:
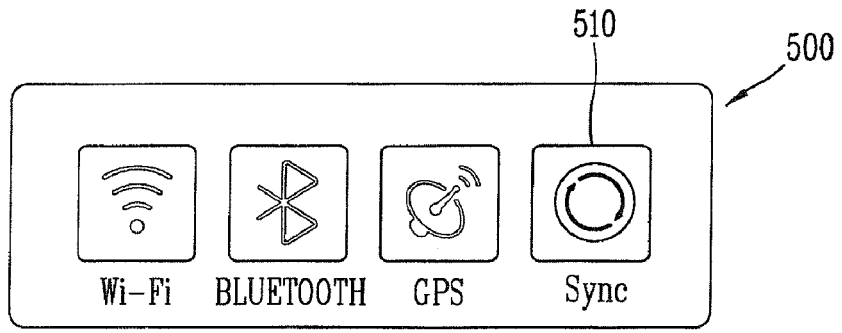
FIG. 5 is a view illustrating the data synchronization of the wireless communication unit 110 according to a first embodiment of the present disclosure.

FIG. 5 is a view illustrating the data synchronization of the wireless communication unit 110 according to a first embodiment of the present disclosure.

The controller 180 may control the wireless communication unit 110 to transmit or receive data to or from an external device based on a usage pattern of the wireless communication unit 110. In this case, the controller 180 may control the wireless communication unit 110 to perform synchronization of data with the external device based on a usage pattern of the wireless communication unit 110.

The usage pattern of the wireless communication unit 110 may include information on an external device connected thereto when the wireless communication unit 110 is in an active state as well as the status information of the wireless communication unit 110 according to time or location information. In this case, the controller 180 may provide an interface of configuring or capable of configuring a connection to the external device if the status corresponding to a current time or location in the usage pattern is a status connected to the external device.

Furthermore, the usage pattern of the wireless communication unit 110 may include information on data transmitted or received to or from an external device connected thereto when the wireless communication unit 110 is in an active state as well as the status information of the wireless communication unit 110 according to time or location information. In this case, the controller 180 may configure a connection to the external device and provide an interface of transmitting or receiving or capable of transmitting or receiving data if the status corresponding to a current time or location in the usage pattern is a status connected to the external device to transmit or receive data. Furthermore, in this case, transmitted or received data may be data for synchronizing data stored in the mobile terminal 100 and external device.

Referring to FIG. 5, according to an embodiment, a region 500 representing the status of the wireless communication unit 110 may include an item representing the status of Wi-Fi, an item representing the status of Bluetooth, an item representing the status of GPS, and an item 510 representing the status of data synchronization. If Wi-Fi, Bluetooth, and GPS are inactive and data synchronization is carried out, then the items representing the status of Wi-Fi, Bluetooth and GPS may be displayed in an inactive state, and the item 510 representing the status of data synchronization may be displayed in a status of performing data synchronization in the region 500 representing the status of the wireless communication unit 110.

Figures 6, 7:
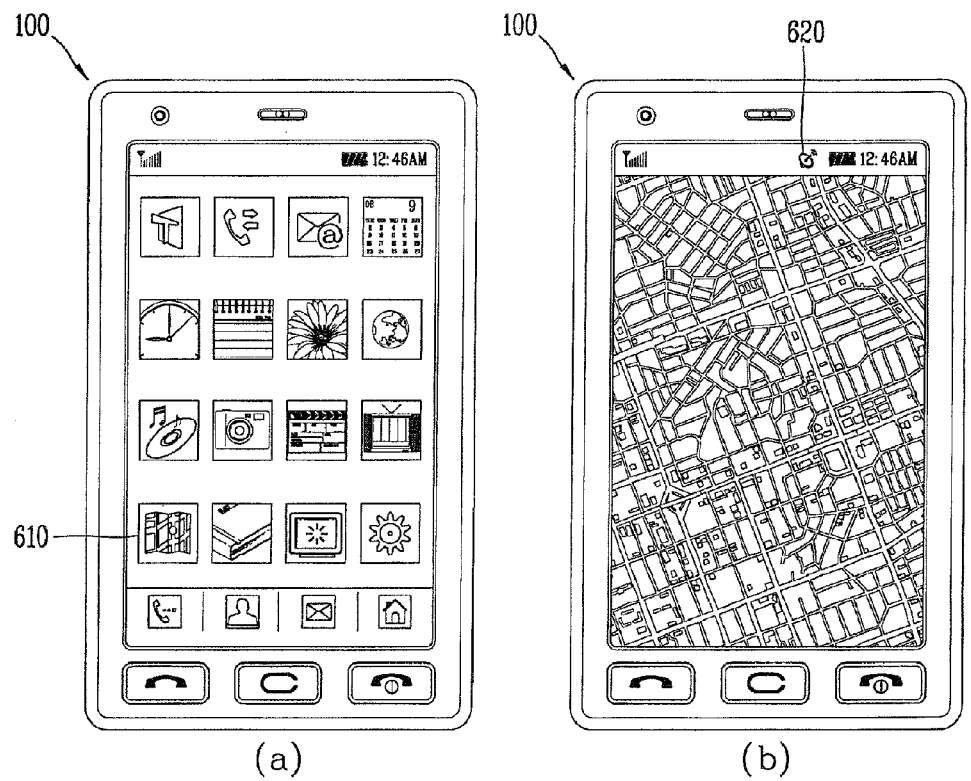
FIG. 6 is a view illustrating the execution of an application according to a first embodiment of the present disclosure.
FIG. 7 is a view illustrating the data structure of a usage pattern according to a first embodiment of the present disclosure.

FIG. 6 is a view illustrating the execution of an application according to a first embodiment of the present disclosure.

The controller 180 may control the execution of an application using the wireless communication unit 110 based on a usage pattern of the wireless communication unit 110. The usage pattern of the wireless communication unit 110 may include information on an application carried out when the wireless communication unit 110 is in an active state as well as the status information of the wireless communication unit 110 according to time or location information. In this case, if the status corresponding to a current time or location in the usage pattern is a status in which an application of changing the wireless communication unit 110 to an active or inactive state has been carrier out, then the controller 180 may provide an interface of executing or capable of executing the relevant application.

Referring to FIG. 6A, according to an embodiment, a plurality of objects may be displayed on the screen of the mobile terminal 100. Each of the plurality of objects can be mapped to each function (for example, application) provided in the mobile terminal 100. If any one of the plurality of objects is selected, then the mobile terminal 100 may implement an application corresponding to the selected object, for example.

If the status corresponding to a current time or location in the usage pattern is a status in which an application of changing the wireless communication unit 110 to an active or inactive state has been carrier out, then the controller 180 may execute the relevant application or provide an interface for which an object 610 mapped to an application can be selected to execute the relevant application.

Referring to FIG. 6B, according to an embodiment, an execution screen of the application may be displayed on the screen of the mobile terminal 100. Furthermore, the status of the wireless communication unit 110 may be changed to an active state by the execution of the application, and an item 620 representing that the status of the wireless communication unit 110 is active may be further displayed on the screen of the mobile terminal 100.

FIG. 7 is a view illustrating the data structure of a usage pattern according to a first embodiment of the present disclosure.

FIG. 7A is a view illustrating the structure of a table in which the status information of the wireless communication unit 110 has been collected according to a first embodiment of the present disclosure.

The table in which the status information of the wireless communication unit 110 has been collected may include a time (TIME) field and a status (STATUS) field. Furthermore, the table in which the status information of the wireless communication unit 110 has been collected may further include a device identification information field (DEVICE_ID) and a connection duration time (DURATION_TIME). The time field, as a field representing time information of the mobile terminal 100, may include time information acquired by a built-in counter or acquired from a repeater. The status field, as a field representing the status of the wireless communication unit 110, may include an active or inactive state, for example. The device identification information field, as a field representing identification field for an external device for which the connection is set or the connection setting is released through the wireless communication unit 110, may include an ID, IP address, or MAC address of the external device. The connection duration time field may include information for a time during which the connection is maintained with an external device for which the mobile terminal 100 has configured a connection thereto through the wireless communication unit 110.

FIG. 7B is a view illustrating the structure of a usage pattern table of the wireless communication unit 110 according to a first embodiment of the present disclosure.

The usage pattern table of the wireless communication unit 110 may include a start time (START_TIME) field, an end time (END_TIME) field, and a status (STATUS) field. Furthermore, the usage pattern table of the wireless communication unit 110 may further include a device identification information (DEVICE_ID) field and a connection duration time (DURATION_TIME) field. The start time field may include time information indicating the start of the section maintaining an active or inactive state in the usage pattern of the wireless communication unit 110, and the end time field may include time information indicating the end of the section maintaining an active or inactive state in the usage pattern. Accordingly, the usage pattern table of the wireless communication unit 110 may be divided by a start time field and an end time field. The status field, device identification information field, and connection duration time field may be similar to the status field, device identification information field, and connection duration time field in FIG. 7A, and thus the description thereof will be omitted.

Figures 8, 9:
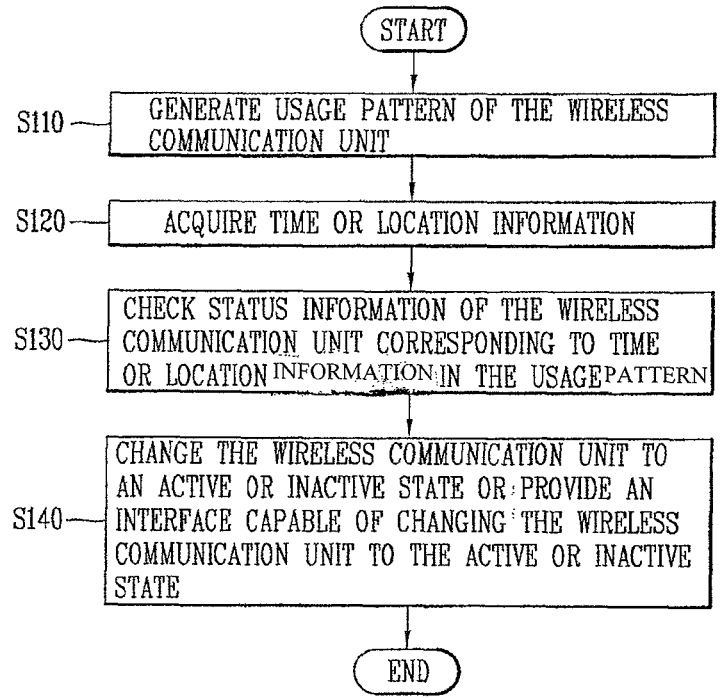
FIG. 8 is a view illustrating the data structure of a usage pattern according to a first embodiment of the present disclosure.
FIG. 9 is a flow chart illustrating a process of controlling the operation of the mobile terminal 100 according to a first embodiment of the present disclosure.

FIG. 8 is a view illustrating the data structure of a usage pattern according to a first embodiment of the present disclosure.

FIG. 8A is a view illustrating the structure of a table in which the status information of the wireless communication unit 110 has been collected according to a first embodiment of the present disclosure.

The table in which the status information of the wireless communication unit 110 has been collected may include a location (LOCATION) field and a status (STATUS) field. Furthermore, the table in which the status information of the wireless communication unit 110 has been collected may further include a device identification information (DEVICE_ID) field and a connection duration time (DURATION_TIME) field. The location field, as a field indicating the location information of the mobile terminal 100, may include location information acquired from a signal received by the location information module 115 or a location based service (LBS) server. The status field, device identification information field, and connection duration time field may be similar to the status field, device identification information field, and connection duration time field in FIG. 7A, and thus the description thereof will be omitted.

FIG. 8B is a view illustrating the structure of a usage pattern table of the wireless communication unit 110 according to a first embodiment of the present disclosure.

The usage pattern table of the wireless communication unit 110 may include an area (AREA) and a status (STATUS) field. Furthermore, the usage pattern table of the wireless communication unit 110 may further include a device identification information (DEVICE_ID) field. The area field may include location information indicating a range during which the active or inactive state is maintained in a usage pattern of the wireless communication unit 110. Accordingly, the usage pattern table of the wireless communication unit 110 may be divided by an area field. The status field, device identification information field, and connection duration time field may be similar to the status field, device identification information field, and connection duration time field in FIG. 7A, and thus the description thereof will be omitted.

FIG. 9 is a flow chart illustrating a process of controlling the operation of the mobile terminal 100 according to a first embodiment of the present disclosure.

The controller 180 may generate a usage pattern of the wireless communication unit 110 (S110). The controller 180 may collect status information indicating the status of the wireless communication unit 110 according to a time or location during a predetermined period of time. Furthermore, the controller 180 may generate a usage pattern of the wireless communication unit 110 based on the collected status information of the wireless communication unit 110. The controller 180 may store the generated usage pattern in the memory 160.

Furthermore, the controller 180 may acquire time or location information (S120). The controller 180 may acquire a current time based on a repeater or built-in counter. Otherwise, the controller 180 may acquire the current location information of the mobile terminal 100 from a signal received by the location information module 115 or a location based service (LBS) server.

Furthermore, the controller 180 may check the status information of the wireless communication unit 110 corresponding to a time or location in the usage pattern (S130) to provide an interface of changing or capable of changing the wireless communication unit 110 to an active or inactive state based on the status information (S140). For example, if a current status is not the status of the wireless communication unit 110 corresponding to the time or location, then the controller 180 may provide an interface of changing or capable of changing the wireless communication unit 110 to a status corresponding to current time or location information.

Figure 10:
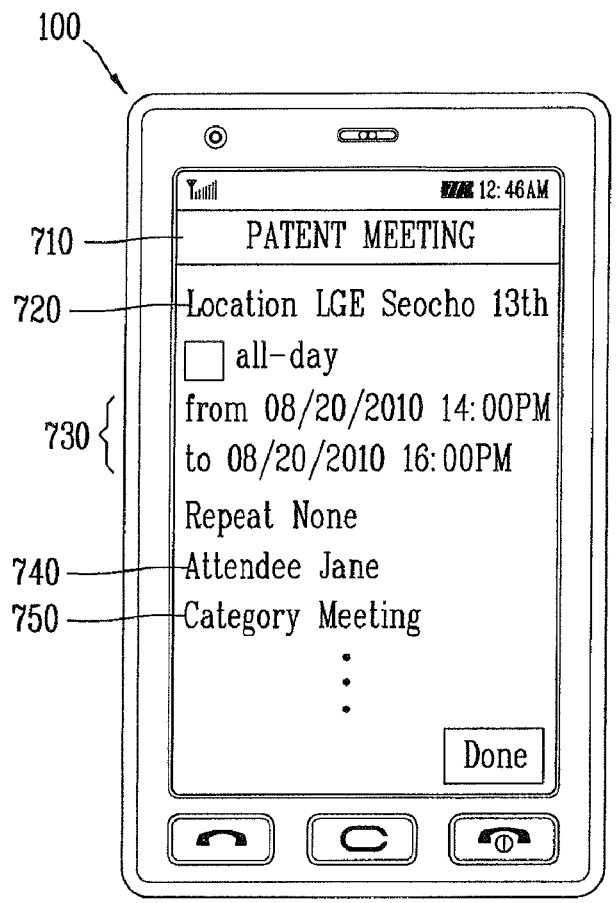
FIG. 10 is a view illustrating a screen of displaying log data according to a second embodiment of the present disclosure.

FIG. 10 is a view illustrating a screen of displaying log data according to a second embodiment of the present disclosure.

The memory 160 may store log data associated with the user's schedule, and the log data associated with the user's schedule may be log data stored in a schedule management application (scheduler). Otherwise, the log data associated with the user's schedule may be log data stored by an application capable of storing data associated with the user's schedule such as a diary, a memo, a calendar, or the like.

Referring to FIG. 10, for example, a screen of displaying log data may be displayed with a function provided by an application capable of storing log data associated with the user's schedule. The log data may include a title or name field 710 for an event associated with the user's schedule, a location field 720 for an event, a date and time field 730 for an event, an attendee field 740 for an event, and a category field 750 for an event. For example, information on each field 710 through 750 may be generated, changed or deleted by the controller 180 according to the user's input.

Figure 11:
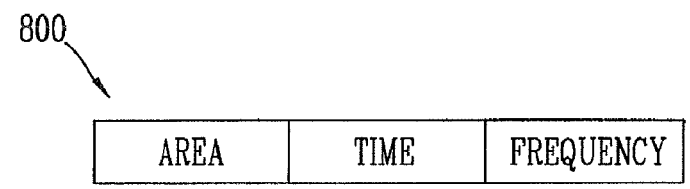
FIG. 11 is a view illustrating the structure of a table in which the location information of the mobile terminal 100 has been collected according to a second embodiment of the present disclosure.

FIG. 11 is a view illustrating the structure of a table in which the location information of the mobile terminal 100 has been collected according to a second embodiment of the present disclosure.

The controller 180 may collect the location information of the mobile terminal 100 for a predetermined period of time to store the collection location information in the memory 160. A table 800 in which the location information of the mobile terminal 100 has been collected may include an area (AREA) field, a time (TIME) field, and a frequency (FREQUENCY) field. The area field may include location information for a range formed according to the location information of the mobile terminal 100 that has been acquired for a predetermined period of time. The time field, as a field indicating the time information of the mobile terminal 100, may include time information acquired by a built-in counter or acquired from a repeater. Furthermore, the frequency field may include a frequency for which the mobile terminal 100 has been located in the relevant region.

Figure 12:
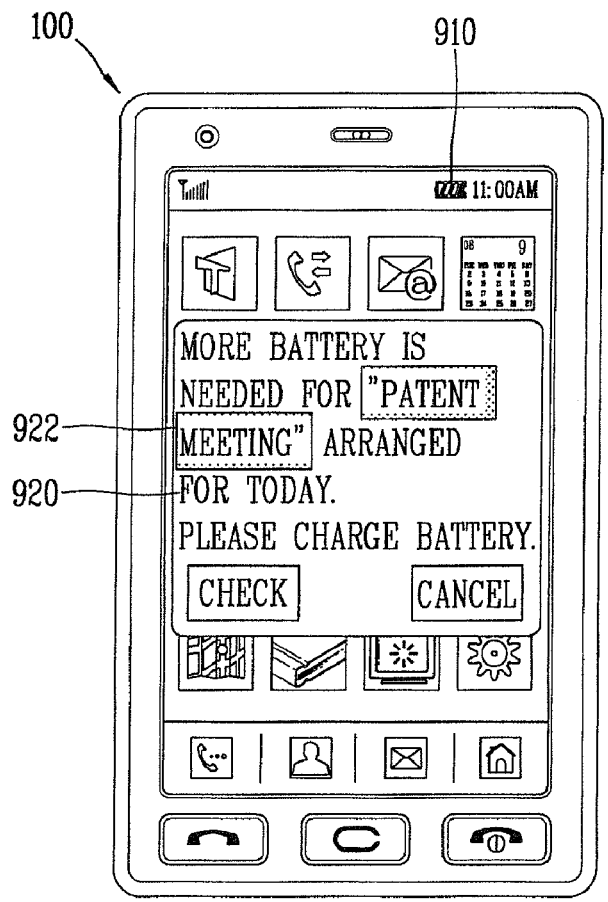
FIG. 12 is a view illustrating a guide message output screen according to a second embodiment of the present disclosure.

FIG. 12 is a view illustrating a guide message output screen according to a second embodiment of the present disclosure.

The controller 180 may acquire location information reflecting the location of the mobile terminal 100 from log data to provide an interface of changing or capable of changing the wireless communication unit 110 to an active or inactive state based on the acquired location information. Furthermore, the memory 160 may store data in which the location information of the mobile terminal has been collected, and the controller 180 may provide an interface of changing or capable of changing the wireless communication unit 110 to active or inactive state based on the acquired location information and the collected data.

For example, the controller 180 refers to a location field 720 for an event from the log data of FIG. 10 to acquire a location at which the event is generated. Furthermore, if the location at which the event is generated is not included in the area (AREA) field in a table in which the location information of the mobile terminal 100 in FIG. 11 has been collected, or the frequency (FREQUENCY) field is less than a threshold value even when included therein, then the controller 180 may provide an interface of changing or capable of changing the wireless communication unit 110 to an active state to maintain the active state of the wireless communication unit 110.

In this case, the controller 180 may check a battery remaining amount of the mobile terminal 100. Furthermore, the controller 180 may check the date and the time field 730 for an event and a current time from the log data of FIG. 10, and may check whether the battery remaining amount is sufficient to maintain the wireless communication unit 110 in an active state when the current time is approached to the generation time of the event. For example, as illustrated in the item 910 indicating a battery remaining amount of the mobile terminal 100, if the battery remaining amount is less than a threshold value, then a guide message 920 indicating that the charge of a battery is required according to the generation of an event may be displayed. In this case, the controller 180 may display the title or name 922 of an event associated with the charge of a battery by including it in the guide message 920 with reference to the title or name field 710 for the event in the log data of FIG. 10.

Figure 13:
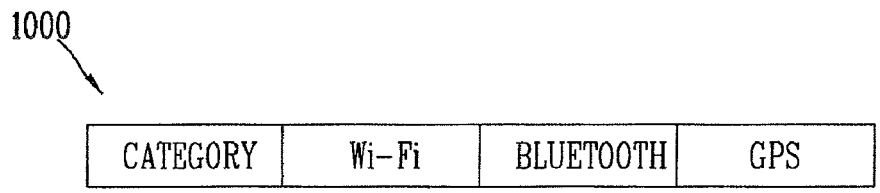
FIG. 13 is a view illustrating the structure of a recommended status table of the wireless communication unit 110 according to a second embodiment of the present disclosure.

FIG. 13 is a view illustrating the structure of a recommended status table of the wireless communication unit 110 according to a second embodiment of the present disclosure.

A recommended status table 1000 of the wireless communication unit 110 may include a category (CATEGORY) field, a Wi-Fi field, a Bluetooth (BLUETOOTH) field, and a GPS field. The category field may include the user's situation information, and the user's situation information may be information that can be inputted in the category field 750 for an event in the log data of FIG. 10. For example, the user's situation information may mean at work, in a meeting, on a date, or the like. The Wi-Fi field, Bluetooth field, and GPS field may include information on the status of Wi-Fi, Bluetooth, and GPS recommended according to the user's situation included in each category field.

Figure 14:
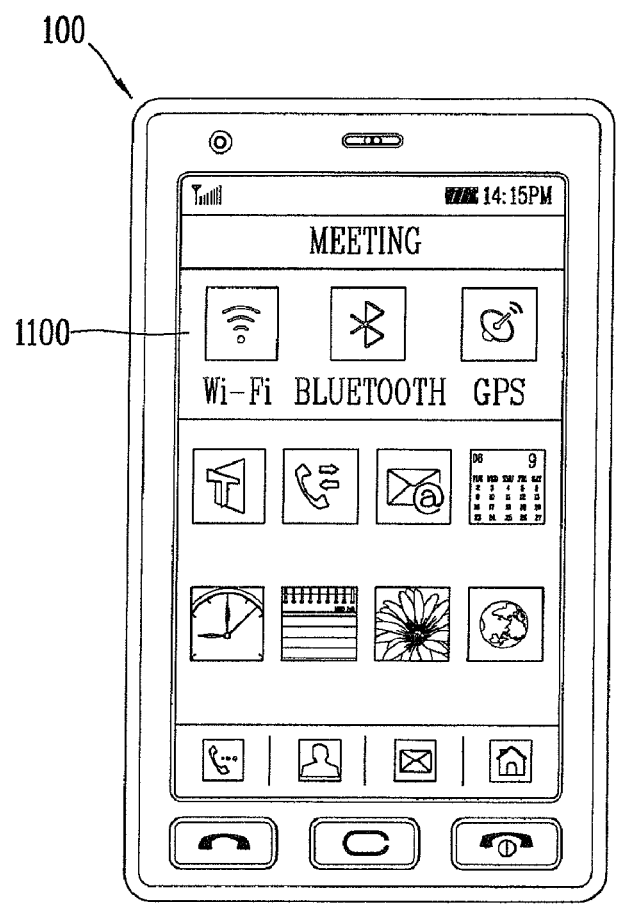
FIG. 14 is a view illustrating a display screen of the mobile terminal 100 according to a second embodiment of the present disclosure.

FIG. 14 is a view illustrating a display screen of the mobile terminal 100 according to a second embodiment of the present disclosure.

The controller 180 may acquire the user's situation information to provide an interface of changing or capable of changing the connection module to an active or inactive state based on the situation information. Furthermore, the controller 180 may syntactically analyze the log data to acquire the user's situation information.

For example, the controller 180 may syntactically analyze the log data of FIG. 10 to acquire the user's situation information from the category field 750 for an event. Furthermore, the controller 180 may acquire the status information of the wireless communication unit 110 for a category corresponding to the user's situation information from a recommended status table 1000 of the wireless communication unit 110 in FIG. 13. The controller 180 may provide an interface of changing or capable of changing the status of the wireless communication unit 110 to an active or inactive state based on the acquired status information of the wireless communication unit 110.

For example, a region 1100 indicating the status of the wireless communication unit 110 may be displayed on the screen of the mobile terminal 100 according to the user's situation information acquired from log data at the generation time or location of an event. When information inputted in the category field 750 of FIG. 10 is a meeting, and the Wi-Fi field, Bluetooth field and GPS field corresponding to the meeting category are inactive in the recommended status table 1000 of the wireless communication unit 110 in FIG. 13, the item indicating the status of Wi-Fi, the item indicating the status of Bluetooth, and the item indicating the status of GPS may be all changed to or maintain an inactive state.

Figure 15:
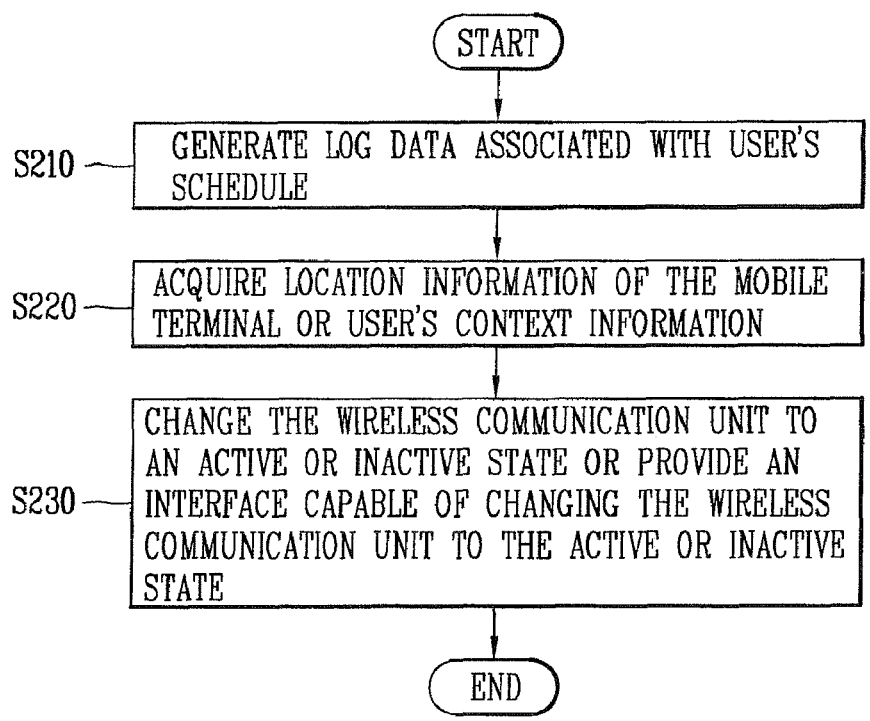
FIG. 15 is a flow chart illustrating a process of controlling the operation of the mobile terminal according to a second embodiment of the present disclosure.

FIG. 15 is a flow chart illustrating a process of controlling the operation of the mobile terminal according to a second embodiment of the present disclosure.

The controller 180 may generate log data associated with the user's schedule (S210). The controller 180 may receive information on an event associated with the user's schedule from the user through an interface provided by an application associated with the user's schedule management. Furthermore, the controller 180 may store the received information on an event in the memory 160 as log data.

Furthermore, the controller 180 may acquire the location information or user's situation information of the mobile terminal 100 based on log data (S220). The controller 180 may collect the location information of the mobile terminal 100 for a predetermined period of time to store the collected location information in the memory 160. Furthermore, the controller 180 may acquire location information reflecting the location of the mobile terminal 100 according to the user's schedule from the log data stored in the memory 160.

Otherwise, the memory 160 may store a recommended status of the wireless communication unit 110 according to the user's situation. Furthermore, the controller 180 may syntactically analyze log data to acquire the user's situation information.

Furthermore, the controller 180 may provide an interface of changing or capable of changing the wireless communication unit 110 to an active or inactive state based on log data, location information or the status information (S230). The controller 180 may compare the collected location information of the mobile terminal 100 and the location information of the mobile terminal 100 acquired from log data to provide an interface of changing or capable of changing the wireless communication unit 110 to an active or inactive state.

Otherwise, the controller 180 may check a recommended status corresponding to the user's situation extracted from log data in the recommended status of the wireless communication unit 110 according to the user's situation stored in the memory 160, and provide an interface of changing or capable of changing the wireless communication unit 110 to an active or inactive state according to the checked recommended status.

According to an embodiment of the present disclosure, the mobile terminal may prevent the consumption of a battery caused by the abuse of the wireless communication unit, thereby effectively managing the battery. Furthermore, according to an embodiment of the present disclosure, the mobile terminal may provide an environment capable of quickly and conveniently connecting to an external device according to a usage pattern of the user. Furthermore, according to an embodiment of the present disclosure, the mobile terminal may provide an environment capable of maintaining a connection with an external device when the user is faced with an unfamiliar situation. Furthermore, according to an embodiment of the present disclosure, there is provided a use configuration of the wireless communication unit appropriate for the user's situation.

A mobile terminal disclosed herein may include all kinds of terminals capable of transmitting and receiving a text message, such as a portable phone, a smart phone, a laptop computer, a digital broadcast terminal, a personal digital assistant (PDA), a portable multimedia player (PMP), a navigation, and the like. The configurations and methods according to the above-described embodiments will not be applicable in a limited way to the foregoing terminal, and all or part of each embodiment may be selectively combined and configured to make various modifications thereto.

Here, the terms and words used herein and the claims should not be construed by limiting to their typical or lexical meaning, but should be construed based on the meaning and concept conforming to the technical spirit of the present invention. Accordingly, the configuration illustrated in the embodiments disclosed herein and the drawings is merely one embodiment of the present invention, and is not intended to represent all the technical spirit of the present invention, and thereby it should be appreciated that there may exist various equivalents and modifications for substituting those at the time of filing this application.

The invention claimed is:

1. A mobile terminal, comprising:
a display unit;
a wireless communication unit;
a storage unit configured to store a usage pattern of the wireless communication unit,
wherein an operation mode of the wireless communication unit is determined based on the usage pattern, and
wherein the usage pattern is related to a status information of the terminal, and the status information is related to at least one of location and time; and
a controller configured to:
extract a current status information of the terminal;
determine an operating mode of the wireless communication unit based on the usage pattern and the current status information;
output, on the display unit, an interface to receive a user's selection for changing the current operating mode to the determined operating mode, based on whether or not a current operating mode of the wireless communication unit corresponds to the determined operating mode of the wireless communication unit which is determined based on the usage pattern and the current status information,
wherein if the current operating mode differs from the determined operating mode, the interface is outputted,
wherein if the current operating mode corresponds to the determined operating mode, the interface is not outputted,
wherein the interface includes at least one graphic object representing the current operating mode of the wireless communication unit, and
wherein the at least one graphic object represents usage time of the mobile terminal during which the mobile terminal can maintain power when the wireless communication is in an active state based on a battery remaining amount or a communication speed together with the current operating mode of the wireless communication unit; and
control the wireless communication unit to change the current operating mode when a corresponding graphic object among the at least one graphic object is selected.

2. The mobile terminal of claim 1, wherein the wireless communication unit comprises at least one of a wireless interne module, a short-range communication module, and a location information module.

3. The mobile terminal of claim 1, wherein the controller provides the interface capable of changing the operating mode of the wireless communication unit on the display unit based on a battery used amount according to the use of the wireless communication unit or a communication speed of the wireless communication unit.

4. The mobile terminal of claim 1, wherein the controller controls the wireless communication unit to transmit or receive data to or from an external device based on the usage pattern.

5. The mobile terminal of claim 4, wherein the controller controls the wireless communication unit to perform synchronization of data with the external device based on the usage pattern.

6. The mobile terminal of claim 1, wherein the controller controls an execution of an application that uses the wireless communication unit based on the usage pattern.

7. The mobile terminal of claim 1, wherein the usage pattern comprises information on the operating mode of the wireless communication unit.

8. The mobile terminal of claim 1, wherein the usage pattern comprises information on an external device for which the connection is established or the connection is terminated by the wireless communication unit under control of the controller.

9. The mobile terminal of claim 1, wherein the usage pattern comprises information on a duration time of the connection establishment to an external device by the wireless communication unit under control of the controller.

10. A mobile terminal, comprising:
a wireless communication unit;
a storage unit configured to store log data associated with a user's schedule; and
a controller configured to:
acquire a location information of the mobile terminal or the user's context information based on the log data;
check a current location of the wireless communication unit;
determine an operating mode of the wireless communication unit based on the log data and the location information or the log data and the context information;
provide an interface to receive the user's selection for changing an operating mode of the wireless communication unit based on the log data and the location information, or the log data and the context information, based on whether a current operating mode of the wireless communication unit corresponds to the determined operating mode of the wireless communication unit,
wherein if the current operating mode differs from the determined operating mode, the interface is provided,
wherein if the current operating mode corresponds to the determined operating mode, the interface is not provided,
wherein the interface includes at least one graphic object representing a current operating mode of the wireless communication unit, and
wherein the at least one graphic object represents usage time of the mobile terminal during which the mobile terminal can maintain power when the wireless communication is in an active state based on a battery remaining amount or a communication speed together with the current operating mode of the wireless communication unit; and control the wireless communication unit to change the current operating mode when a corresponding graphic object among the at least one graphic object is selected.

11. The mobile terminal of claim 10, wherein the storage unit stores information on a recommended status of the wireless communication unit according to the user's context information, and the controller provides the interface to receive the user's selection for changing the operating mode of the wireless communication unit based on the log data and the information on the recommended status.

12. A method of controlling the operation of a mobile terminal, the method comprising:

extracting a usage pattern of a wireless communication unit, wherein an operation mode of the wireless communication unit is determined based on the usage pattern, and wherein the usage pattern is related to a status information of the terminal, and the status information is related to at least one location and time;

checking a current status information of the terminal;

determining an operating mode of the wireless communication unit based on the usage pattern and the current status information;

outputting, on the display unit, an interface to receive a user's selection for changing the current operating mode to the determined operating mode based on whether a current operating mode of the wireless communication unit corresponds to the determined operating mode of the wireless communication unit, wherein if the current operating mode differs from the determined operating mode, the interface is outputted, wherein if the current operating mode corresponds to the determined operating mode, the interface is not outputted, wherein the interface includes at least one graphic object representing the current operating mode of the wireless communication unit, and wherein the at least one graphic object represents usage time of the mobile terminal during which the mobile terminal can maintain power when the wireless communication is in an active state based on a battery remaining amount or a communication speed together with the current operating mode of the wireless communication unit; and controlling the wireless communication unit to change the current operating mode when a corresponding graphic object among the at least one graphic object is selected.

13. A method of controlling the operation of a mobile terminal, the method comprising:

generating log data associated with a user's schedule;

acquiring a location information of the mobile terminal or the user's context information based on the log data;

checking a current location of a wireless communication unit of the mobile terminal;

providing an interface to receive a user's selection for changing an operating mode of the wireless communication unit based on the log data and the location information, or the log data and the context information based on whether a current operating mode of the wireless communication unit corresponds to the determined operating mode of the wireless communication unit, wherein if the current operating mode differs from the determined operating mode, the interface is provided, wherein if the current operating mode corresponds to the determined operating mode, the interface is not provided, and wherein the interface includes at least one graphic object representing the current operating mode of the wireless communication unit, and wherein the at least one graphic object represents usage time of the mobile terminal during which the mobile terminal can maintain power when the wireless communication is in an active state based on a battery remaining amount or a communication speed together with the current operating mode of the wireless communication unit; and controlling the wireless communication unit to change the current operating mode when a corresponding graphic object among the at least one graphic object is selected.

* * * * *